United States Patent
Chai et al.

(10) Patent No.: US 11,352,495 B2
(45) Date of Patent: Jun. 7, 2022

(54) THERMOPLASTIC RESIN AND THERMOPLASTIC RESIN COMPOSITION

(71) Applicant: LG CHEM, LTD., Seoul (KR)

(72) Inventors: Joo Byung Chai, Daejeon (KR); Tae Young Jeon, Daejeon (KR); Yu Sung Jung, Daejeon (KR); Jong Beom Kim, Daejeon (KR); Chang Sull Kim, Daejeon (KR); Eun Seon Park, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1064 days.

(21) Appl. No.: 15/775,340

(22) PCT Filed: Aug. 2, 2017

(86) PCT No.: PCT/KR2017/008347
§ 371 (c)(1),
(2) Date: May 10, 2018

(87) PCT Pub. No.: WO2018/088677
PCT Pub. Date: May 17, 2018

(65) Prior Publication Data
US 2021/0163736 A1    Jun. 3, 2021

(30) Foreign Application Priority Data

Nov. 11, 2016 (KR) .................. 10-2016-0149954
Jul. 25, 2017 (KR) .................. 10-2017-0094026

(51) Int. Cl.
| C08L 71/12 | (2006.01) |
| C08F 279/04 | (2006.01) |
| C08L 55/02 | (2006.01) |
| C08J 3/12 | (2006.01) |

(52) U.S. Cl.
CPC .......... *C08L 71/123* (2013.01); *C08F 279/04* (2013.01); *C08J 3/126* (2013.01); *C08L 55/02* (2013.01); *C08L 71/12* (2013.01); *C08L 2207/53* (2013.01)

(58) Field of Classification Search
CPC ....... C08F 279/04; C08J 3/126; C08L 71/123; C08L 55/02; C08L 71/12; C08L 2207/53
See application file for complete search history.

(56) References Cited

U.S. PATENT DOCUMENTS

| 4,360,618 A | 11/1982 | Trementozzi | |
| 6,084,054 A | 7/2000 | Barren et al. | |
| 6,492,467 B1 * | 12/2002 | Kim ................ | C08F 279/04 525/316 |
| 2014/0094556 A1 * | 4/2014 | Ahn ................ | C08L 51/04 524/504 |
| 2018/0116918 A1 * | 5/2018 | Jones .............. | A61K 8/4946 |
| 2020/0140672 A1 * | 5/2020 | Choi .............. | C08F 285/00 |

FOREIGN PATENT DOCUMENTS

| CN | 1404506 A | 3/2003 |
| CN | 1795210 A | 6/2006 |
| CN | 102199253 | 2/2013 |
| EP | 2157129 | 2/2010 |
| EP | 3363819 | 8/2018 |
| JP | 57008139 B2 | 1/1982 |
| JP | 03021656 A | 1/1991 |
| JP | 1996253647 A | 10/1996 |
| JP | 2001163929 A | 6/2001 |
| JP | 2002509972 A | 4/2002 |
| JP | 2005503465 A | 2/2005 |
| JP | 2006045252 A | 2/2006 |
| JP | 2006528722 A | 12/2006 |
| JP | 2014510181 A | 4/2014 |
| KR | 10-2000-0009217 A | 2/2000 |
| KR | 10-2001-0078716 A | 8/2001 |
| KR | 10-0364060 B1 | 12/2002 |
| KR | 20040094697 A | 11/2004 |
| KR | 10-2005-0069908 A | 7/2005 |
| KR | 10-0530568 B1 | 11/2005 |
| KR | 10-0570430 B1 | 4/2006 |
| KR | 10-0708991 B1 | 4/2007 |

(Continued)

OTHER PUBLICATIONS

International Search Report for PCT/KR2017/008347 filed on Aug. 2, 2017.
Search Report dated Jan. 24, 2019 for European Application No. 17866372.0.
Office Action dated Dec. 31, 2019 for Chinese Application 201780004324.4.

*Primary Examiner* — Patrick D Niland

(57) ABSTRACT

The present invention relates to a thermoplastic resin. More particularly, the present invention relates to a thermoplastic resin that is a graft copolymer having a seed-shell structure and includes a bimodal seed including a large-diameter rubbery polymer having an average particle diameter of greater than 2,000 Å and 3,500 Å or less and a small-diameter rubbery polymer having an average particle diameter of 500 Å to 2,000 Å; and an aromatic vinyl-vinyl cyan shell, wherein the aromatic vinyl cyan compound is included in an amount of 5% by weight to 28% by weight based on a total weight of the aromatic vinyl-vinyl cyan shell. In accordance with the present invention, a thermoplastic resin having a composition capable of improving graft density, and a thermoplastic resin composition capable of increasing dispersion and having high gloss due to inclusion of the thermoplastic resin are provided.

14 Claims, 2 Drawing Sheets

(56) References Cited

FOREIGN PATENT DOCUMENTS

| KR | 10-2011-0019443 A | 2/2011 |
| KR | 20130090364 A | 8/2013 |
| KR | 10-1322102 B1 | 10/2013 |

* cited by examiner

【FIG. 1a】
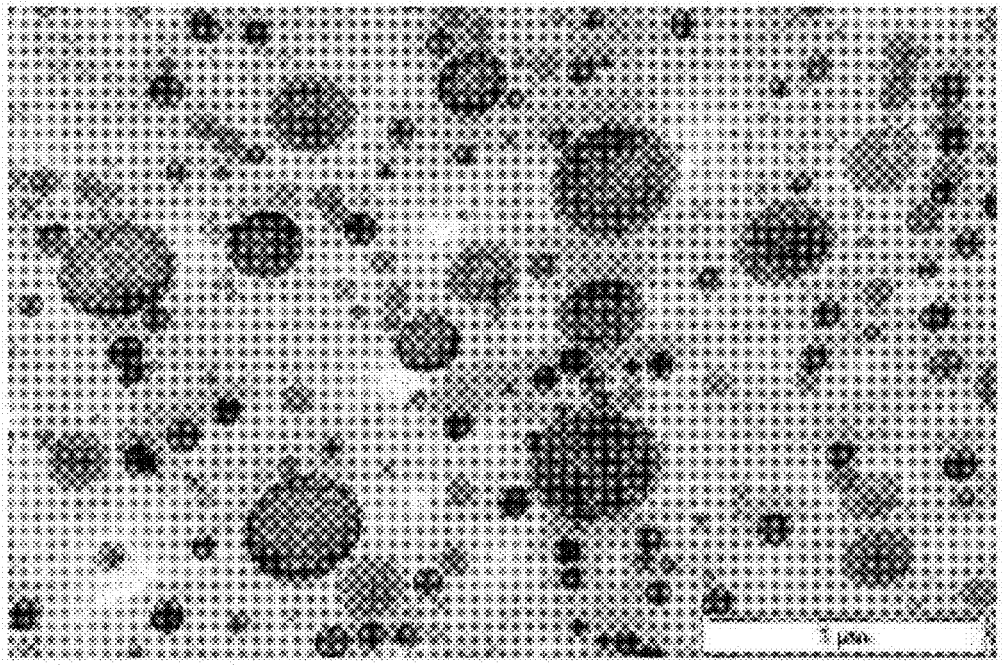
【FIG. 1b】
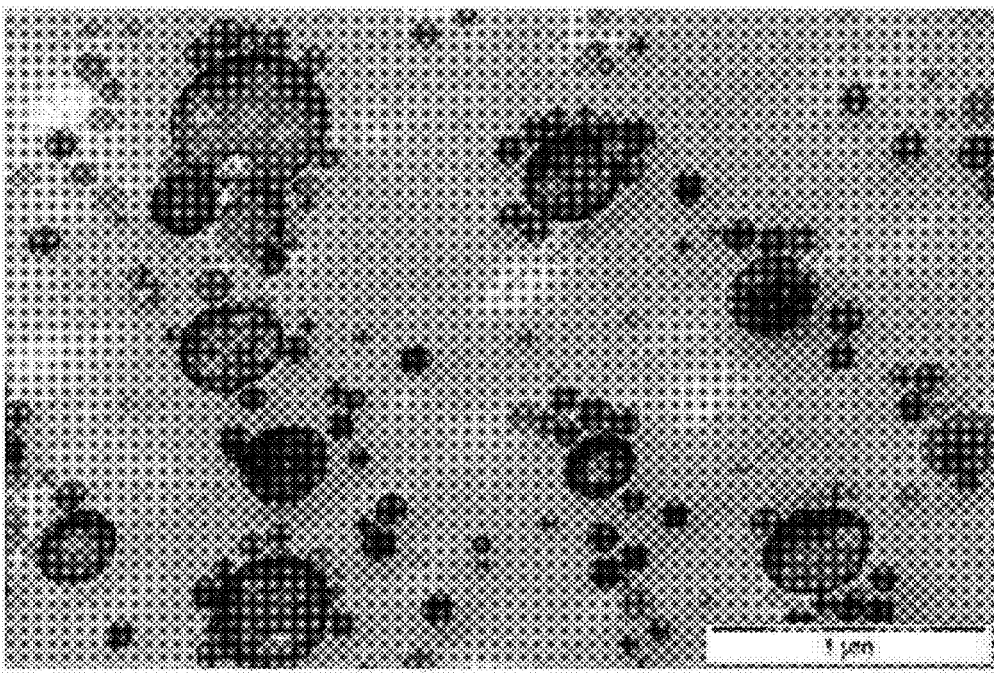

[FIG. 1c]
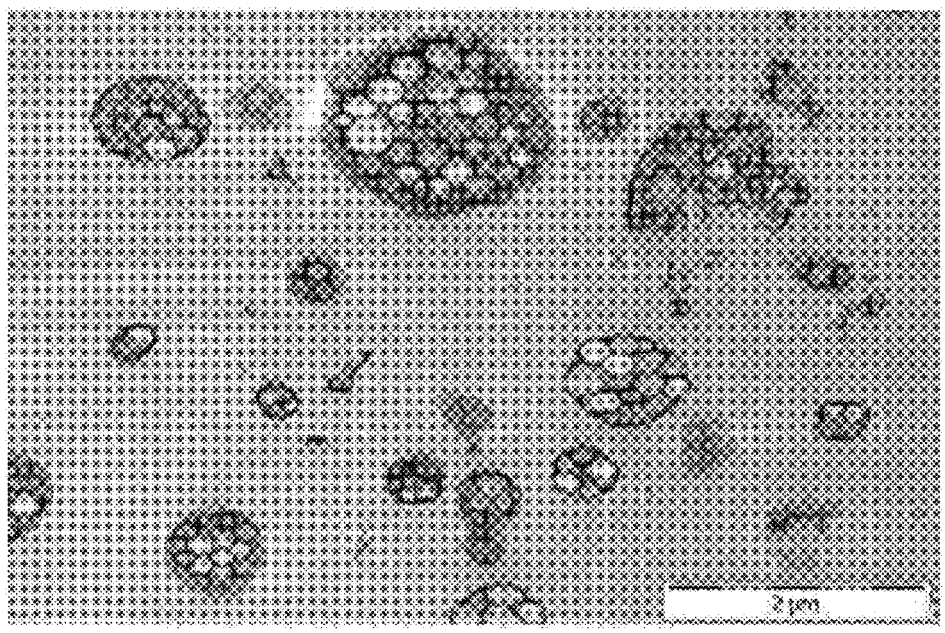
[FIG. 2]
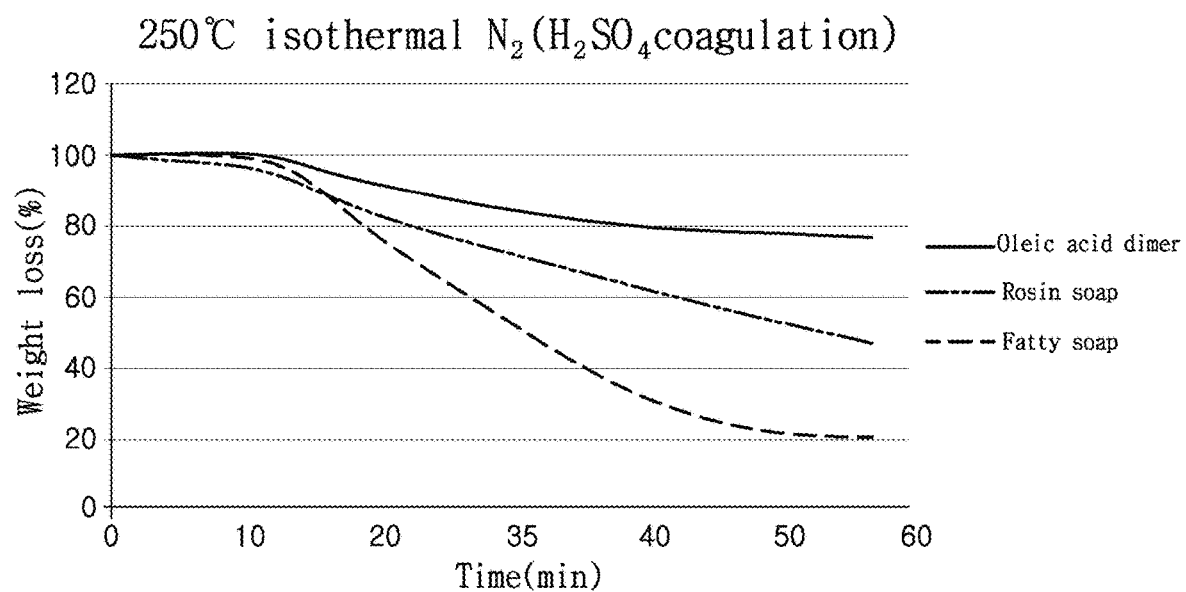

THERMOPLASTIC RESIN AND THERMOPLASTIC RESIN COMPOSITION

CROSS-REFERENCE TO RELATED APPLICATIONS

This application is a U.S. National Stage of PCT/KR2017/008347 filed Aug. 2, 2017, which claims the priority benefit of Korean Patent Application No. 10-2016-0149954, filed on Nov. 11, 2016, and Korean Patent Application No. 10-2017-0094026, filed on Jul. 25, 2017, in the Korean Intellectual Property Office, the disclosures of which are incorporated herein by reference.

TECHNICAL FIELD

The present invention relates to a thermoplastic resin and a thermoplastic resin composition. More particularly, the present invention relates to a thermoplastic resin having a composition capable of improving graft density, and a thermoplastic resin composition capable of improving dispersion and providing high gloss by including the thermoplastic resin.

BACKGROUND ART

Acrylonitrile-butadiene-styrene (hereinafter referred to as "ABS") resin has been widely applied to automotive components, electrical and electronic products, office equipment, and the like due to stiffness and chemical resistance of acrylonitrile, processability, mechanical strength, and aesthetically pleasing appearance of butadiene and styrene, and the like. Surface gloss and dispersion of various blended resins including such an ABS resin are important factors determining the quality of processed molded articles.

However, since surface gloss and dispersion of such various blended resins including an ABS resin are affected by the sizes of particles and the distribution thereof as well as various factors, such as unreacted monomers and an emulsifier, an additive, such as a compatibilizer, is separately added during high-temperature extrusion and injection-molding, when graft density is low. However, in this case, there are disadvantages such as poor processability and an increase in a gas generation amount during processing. Therefore, there is a need for a technique for improving surface gloss and dispersion of various blended resins including an ABS resin.

RELATED ART DOCUMENT

[Patent Document] (Patent Document 1) U.S. Pat. No. 4,360,618

DISCLOSURE

Technical Problem

Therefore, the present invention has been made in view of the above problems, and it is one object of the present invention to provide a thermoplastic resin having a composition capable of improving graft density, and a thermoplastic resin composition capable of improving dispersion and providing high gloss by including the thermoplastic resin.

The above and other objects can be accomplished by the present disclosure described below.

Technical Solution

In accordance with one aspect of the present invention, provided is a thermoplastic resin that is a graft copolymer having a seed-shell structure and includes a bimodal seed including a large-diameter rubbery polymer having an average particle diameter of greater than 2,000 Å and 3,500 Å or less and a small-diameter rubbery polymer having an average particle diameter of 500 Å to 2,000 Å; and an aromatic vinyl-vinyl cyan polymer shell enclosing the seed, wherein the aromatic vinyl cyan compound is included in an amount of 5% by weight to 28% by weight based on a total weight of the aromatic vinyl-vinyl cyan shell.

In accordance with another aspect of the present invention, provided is a thermoplastic resin composition, including the thermoplastic resin and polyarylene ether, wherein the thermoplastic resin is included in an amount of 15 to 50% by weight and the polyarylene ether is included in an amount of 50 to 85% by weight.

Advantageous Effects

As apparent from the fore-going, the present invention provides a thermoplastic resin having a composition capable of improving graft density, and a thermoplastic resin composition capable of improving dispersion and providing high gloss by including the thermoplastic resin.

DESCRIPTION OF DRAWINGS

FIGS. 1a, 1b, and 1c are scanning electron microscope (SEM) photographs illustrating dispersions of specimens of thermoplastic resin compositions prepared according to an example and comparative examples. In particular, FIG. 1a corresponds to the specimen of Example 1, FIG. 1b corresponds to the specimen of Comparative Example 1, and FIG. 1c corresponds to the specimen of Comparative Example 2.

FIG. 2 illustrates a thermogravimetric analysis (TGA) graph comparing thermal stability dependent upon an emulsifier type.

BEST MODE

Hereinafter, the present invention is described in detail.

A thermoplastic resin according to the present invention is a graft copolymer having a seed-shell structure and includes a bimodal seed including a large-diameter rubbery polymer having an average particle diameter of greater than 2,000 Å and 3,500 Å or less and a small-diameter rubbery polymer having an average particle diameter of 500 Å to 2,000 Å; and an aromatic vinyl-vinyl cyan polymer shell enclosing the seed, wherein the aromatic vinyl cyan compound is included in an amount of 5% by weight to 28% by weight based on a total weight of the aromatic vinyl-vinyl cyan shell.

The thermoplastic resin is a graft copolymer having a seed-shell structure and may include, for example, (a) a seed including a conjugated bimodal diene-based rubbery polymer; and (b) a shell enclosing the seed and prepared by polymerizing an aromatic vinyl compound, a vinyl cyan compound, and a fatty acid dimer or a metal salt thereof.

The conjugated diene-based rubbery polymer of the seed may be prepared by polymerizing one or more conjugated diene-based compounds selected from the group consisting of 1,3-butadiene, 2,3-dimethyl-1,3-butadiene, 2-ethyl-1,3-butadiene, 1,3-pentadiene, and isoprene.

The seed may be prepared, for example, by emulsion polymerization. In this case, superior mechanical properties are provided. An emulsion polymerization method is not specifically limited so long as it is a general method. As another example, the seed may have a latex form wherein a polymerized rubbery polymer is dispersed in water in a colloidal state.

The seed may be a bimodal seed including a large-diameter seed having, for example, an average particle diameter of greater than 2,000 Å and 3,500 Å or less, 2,500 Å or more to 3,500 Å or less, or 3,000 Å or more to 3,500 Å or less, and a gel content of 60 to 95% by weight, 65 to 80% by weight, or 65 to 75% by weight and a small-diameter seed having, for example, an average particle diameter of 500 Å to 2,000 Å, 1,000 Å to 2,000 Å, or 1,000 Å to 1,500 Å and a gel content of 60 to 95% by weight, 70 to 95% by weight, or 80 to 95% by weight. Within this range, superior impact strength and mechanical properties are provided.

In the present disclosure, "average particle diameter" is measured according to a dynamic laser light scaling method by means of a Nicomp 370HPL device manufactured by Nicomp, USA.

In the present disclosure, to find a gel content, a polybutadiene rubber latex was solidified using a dilute acid or a metal salt, followed by washing. This washed polybutadiene rubber latex was dried for 24 hours in a 60° C. vacuum oven. An obtained rubber lump was cut into small pieces with scissors. Subsequently, 1 g of a rubber piece was placed in 100 g of toluene and stored for 48 hours in a dark room at room temperature, followed by separating into a sol and gel. The resultant sol and gel were respectively dried. Subsequently, a gel content was measured according to the following equation:

$$\text{Gel content (\% by weight)} = \frac{\text{Weight of insoluble matter (gel)}}{\text{Weight of sample}} \times 100$$

A weight ratio of the large-diameter seed to the small-diameter seed constituting the seed may be, for example, 50:50 to 90:10, 60:40 to 75:25, 60:40 to 70:20, or 70:30 to 75:25. Within this range, superior dispersion and surface characteristics are provided.

The seed may be included, for example, in an amount of 30 to 80% by weight, 40 to 75% by weight, or 50 to 70% by weight based on 100% by weight of a total of the conjugated diene-based rubbery polymer, the aromatic vinyl compound, and the vinyl cyan compound. Within this range, superior mechanical properties and surface characteristics are provided.

The shell encloses the bimodal seed and is prepared by emulsion-graft-polymerizing a fatty acid having an average carbon number and an average molecular weight or a metal salt thereof. For example, the fatty acid or the metal salt thereof may be included in an amount of 20 to 70% by weight, 25 to 60% by weight, or 30 to 50% by weight based on 100% by weight of a total of the conjugated diene-based rubbery polymer, the aromatic vinyl compound, and the vinyl cyan compound. Within this range, superior mechanical properties and property balance are provided.

The aromatic vinyl compound may be, for example, one or more selected from the group consisting of styrene, α-methyl styrene, α-ethyl styrene, p-methyl styrene, o-methyl styrene, o-t-butyl styrene, bromostyrene, chlorostyrene, trichlorostyrene, and derivatives thereof, and the vinyl cyan compound may be, for example, one or more selected from the group consisting of acrylonitrile, methacrylonitrile, ethacrylonitrile, and derivatives thereof.

In the present disclosure, the expression "derivative" may refer to a compound, one or more hydrogen atoms of which are substituted with a halogen group, an alkyl group, or a hydroxyl group.

The vinyl cyan compound is preferably included in an amount of 5 to 28% by weight, 5% by weight or more to less than 25% by weight, 5 to 20% by weight, 5 to 15% by weight, or 5 to 10% by weight based on a total weight of the shell (aromatic vinyl-vinyl cyan polymer shell). Within this range, superior mechanical properties and property balance are provided. The aromatic vinyl compound and the vinyl cyan compound included in the shell may be included, for example, in a weight ratio of 90:10 to 99:1.

The fatty acid may be, for example, two or more, two to ten, or two to five fatty acid dimer types having different carbon atom number chains, a metal salt thereof, or a mixture thereof. An average carbon atom number of a chain of the fatty acid may be, for example, 10 or more, 33 or more, 33 to 44, or 33 to 36. Within this range, thermal stability is superior, thereby reducing an amount of gas generated during extrusion and injection-molding.

The fatty acid may include, for example, an unsaturated fatty acid dimer having an unsaturation degree of 1 to 20, 1 to 10, 1 to 5, or 2 to 3. Within this range, an amount of volatilized substances is small during extrusion and injection-molding.

The fatty acid may have, for example, a molecular weight of 500 g/mol or more, 500 to 2000 g/mol, or 500 to 1000 g/mol. Within this range, thermal stability is superior, thereby reducing a gas generation amount during extrusion and injection-molding.

Here, "molecular weight" refers to an average molecular weight or a weight average molecular weight obtained by, after dissolving a solid in THF to a concentration of 0.2% by weight, drying in a 120° C. oven for 15 minutes, and measuring the dissolved solution by means of gel permeation chromatography (GPC).

The fatty acid may include, for example, one or more selected from the group consisting of oleic acid, an oleic acid-based dimer, myristoleic acid, linoleic acid, and a metal salt thereof.

A metal of the metal salt is, for example, an alkali metal, particularly potassium, sodium, or the like.

The fatty acid may be included, for example, in an amount of 0.1 to 3 parts by weight, 0.1 to 2 parts by weight, or 0.1 to 1 part by weight, or 0.1 to 0.3 parts by weight based on 100 parts by weight of a total content of the conjugated diene-based rubbery polymer, the aromatic vinyl compound, and the vinyl cyan compound. Within this range, polymerization stability and storage stability of a polymer are increased.

The fatty acid may include, for example, 50% by weight or more, 60 to 100% by weight, or 61 to 100% by weight of the oleic acid-based dimer. Within this range, thermal stability is excellent, thereby reducing a gas generation amount during extrusion and injection-molding.

The fatty acid may be included, for example, in an amount of 0.1 to 3 parts by weight, 0.1 to 2 parts by weight, or 0.1 to 1 part by weight, or 0.1 to 0.3 parts by weight based on 100 parts by weight of a total content of the conjugated diene-based rubbery polymer, the aromatic vinyl compound, and the vinyl cyan compound.

The thermoplastic resin of the present invention may have, for example, a graft rate of 50% or more, 60 to 90%, or 70 to 85%. Within this range, surface gloss and dispersion are superior and mechanical properties are excellent.

The thermoplastic resin of the present invention may have, for example, a weight average molecular weight of 20,000 to 200,000 g/mol, 20,000 to 150,000 g/mol, 20,000 to 100,000 g/mol, 30,000 g/mol or more and less than 85,000 g/mol, or 30,000 to 70,000 g/mol. Within this range, surface gloss and dispersion are superior and mechanical properties are excellent.

The thermoplastic resin of the present invention may have, as another example, a weight average molecular weight of 100,000 to 200,000 g/mol, 120,000 to 180,000 g/mol, or 130,000 to 170,000 g/mol. Within this range, surface gloss and dispersion are superior and mechanical properties are excellent.

Here, the "weight average molecular weight" refers to a molecular weight measured by gel permeation chromatography (GPC).

The thermoplastic resin of the present invention may have a graft density ($\sigma$) of greater than 0.12 and 0.80 or less, 0.20 to 0.70, or 0.30 to 0.64. Within this range, surface gloss and dispersion are superior and mechanical properties are excellent.

Here, the graft density ($\sigma$) is calculated according to the following mathematical equation:

$$\sigma = \frac{g_d D \rho_P N_A}{6 M_g}$$

wherein $g_d$ is a graft rate (%) calculated according to Mathematical Equation 2 below, D is an average particle diameter measured by a light scattering method, $\rho$ is a density value of butadiene rubber particles measured according to ASTM D792, $\rho_P$ represents a large-diameter PBL of 0.94 g/cm$^3$ and a small-diameter PBL of 0.97 g/cm$^3$, $N_A$ is Avogadro's constant, and $M_g$ is a molecular weight measured by GPC after dissolving a dried form of a sol, separated from a supernatant by a sol-gel separation method, in a TFT solution and is within 20,000 to 150,000 g/mol:

Graft rate=Weight of grafted monomers (g)/weight of rubber (g)×100          [Mathematical Equation 2]

wherein the weight of the grafted monomers is (weight of precipitate remaining after sol-gel separation (g))−(weight of rubber (g)), and the weight of the rubber is a theoretical solid weight of added rubbery polymer (g)).

The sol-gel separation method may be performed by, for example, adding 1 g of an obtained powder-type thermoplastic resin to 50 g of acetone, dissolving the same by stirring for 24 hours, separating the resultant solution under conditions of 20,000 rpm and −20° C. using a centrifuge, and separating a separated supernatant into a sol and a gel.

When the powder-type thermoplastic resin is obtained through coagulation using a salt, superior pyrolysis stability is exhibited, thereby reducing a gas generation amount during extrusion and injection-molding.

The salt may be, for example, a sulfate such as MgSO$_4$, a calcium salt such as CaCl$_2$, a carbonate, or a mixture thereof. In this case, volatilization temperature of a remaining emulsifier increases due to binding, whereby an amount of gas generated due to residues upon processing at high temperature is reduced. Accordingly, deposit formation on a surface of an injection-molded product is prevented and surface smoothness is improved, thereby providing advantages in obtaining aesthetically pleasing appearance upon secondary processing such as plating.

The thermoplastic resin of the present invention provides a composition capable of improving a graft density, thereby increasing dispersion of a blended resin and thus providing high gloss.

A method of preparing the thermoplastic resin of the present invention is not specifically limited and may include, for example, a step of polymerizing a seed; and a step of preparing a shell by emulsion-graft-polymerizing the seed with a fatty acid having a chain of 10 or more carbon atoms on average and a molecular weight of 500 to 2000 g/mol or a metal salt thereof.

The seed may include, for example, a large-diameter rubbery polymer having an average particle diameter of greater than 2,000 Å and 3,500 Å or less and a small-diameter rubbery polymer having an average particle diameter of 500 Å to 2,000 Å.

The seed polymerization, for example, may be performed through emulsion polymerization.

The seed polymerization and the emulsion graft polymerization are not specifically limited so long as they are methods generally used to prepare an ABS resin.

In an embodiment, in the method of preparing the thermoplastic resin of the present invention, one or more selected from the group consisting of alkyl aryl sulfonate, alkali methyl alkyl sulfate, sulfonated alkyl ester, and a metal salt of unsaturated fatty acid may be additionally included as an emulsifier upon the seed polymerization and/or the emulsion graft polymerization, and may be added in an amount of 1.0 to 3.0 parts by weight based on 100 parts by weight of a total of the monomers (including the rubbery polymer upon emulsion graft polymerization).

In the method of preparing the thermoplastic resin of the present invention, a water-soluble initiator or a liposoluble initiator may be used an initiator upon seed polymerization and/or emulsion graft polymerization. Here, the water-soluble initiator includes, for example, sodium persulfate, potassium persulfate, ammonium persulfate, and the like, and the liposoluble initiator includes cumene hydroperoxide, diisopropyl benzene hydroperoxide, tertiary butyl hydroperoxide, paramenthane hydroperoxide, benzoyl peroxide, and the like. As needed, a combination of the water-soluble initiator and the liposoluble initiator may be used.

The initiator may be used, for example, in an amount of 0.01 to 0.5 parts by weight or 0.1 to 0.3 parts by weight based on 100 parts by weight of a total of the monomers (including the rubbery polymer upon the emulsion graft polymerization). Within this range, excessive reaction does not occur and a polymer having a desired particle diameter and size distribution may be produced.

In the method of preparing the thermoplastic resin of the present invention, one or more selected from the group consisting of, for example, sodium formaldehyde sulfoxylate, sodium ethylene diamine tetraacetate, ferrous sulfate, dextrose, pyrrole sodium phosphate, and sodium sulfite may be included as an oxidation-reduction catalyst upon the seed polymerization and/or the emulsion graft polymerization.

The oxidation-reduction catalyst may be used, for example, in an amount of 0.001 to 0.4 parts by weight, 0.005 to 0.2 parts by weight, or 0.01 to 0.2 parts by weight based on 100 parts by weight of a total of the monomers (including the rubbery polymer upon the emulsion graft polymerization). Within this range, polymerization is facilitated and thus the thermoplastic resin may be rapidly prepared.

In the step of emulsion-graft-polymerizing the shell, the emulsion graft polymerization is preferably performed at 60 to 90° C. or 60 to 80° C. for 3 to 5 hours or 2 to 4 hours after adding the reactants. Within this range, the initiator is activated, whereby polymerization is initiated and heat removal is easy. In addition, when temperature and reaction time are controlled within the range, a polymer having uniform size distribution may be produced.

The step of emulsion-graft-polymerizing the shell may further include 0.1 to 1 part by weight, 0.2 to 0.6 parts by weight, or 0.3 to 0.5 parts by weight of a molecular weight regulator, as needed, based on 100 parts by weight of a total content of the conjugated diene-based rubbery polymer, the aromatic vinyl compound, and the vinyl cyan compound. When the molecular weight regulator is included within this range, a polymer having a desired average particle diameter may be advantageously formed and a polymer having a uniform size is provided.

As the molecular weight regulator, for example, a mercaptan-based compound, such as tertiary dodecyl mercaptan, may be used.

In another embodiment of the present invention, the initiator and the oxidation-reduction catalyst used in the graft polymerization may be added batchwise at an initial reaction stage. However, when the initiator and the oxidation-reduction catalyst are split-added as described above, reaction heat may be easily removed, and a content of unreacted monomers may be reduced while preventing side reactions, thereby improving quality and productivity of a resultant polymer.

After completing the addition, temperature is elevated up to 60 to 100° C., or 70 to 90° C. at a temperature elevation rate of 5 to 30/hr, or 10 to 20/hr, thereby performing second graft polymerization. When reaction temperature is elevated within this range, reaction of unreacted monomers is facilitated, thereby rapidly accomplishing a high conversion rate.

The polymerization is preferably terminated, for example, when a polymerization conversion rate is 90 to 99%, 95 to 99% or 97 to 99%. Within this range, a content of unreacted monomers in a product is low and a polymer having a high polymerization degree may be produced.

In the present disclosure, the "polymerization conversion rate" is calculated according to the following mathematical equation after drying 1.5 g of a graft copolymer latex in a 150° C. hot air dryer for 15 minutes and measuring a weight of the dried graft copolymer latex to find a total solid content (TSC):

$$\text{Polymerization conversion rate (\%)} = \frac{TSC \times (M + W + S)}{100} \cdot S$$

TSC: Total solid content (parts by weight)
M: Content of total of added monomers (parts by weight)
W: Content of added water (parts by weight)
S: Content of added emulsifier and other solid-type supplementary materials (parts by weight)

Other reaction conditions, such as graft rate and reaction pressure, other than the aforementioned conditions, are not specifically limited so long as they have generally been performed in the technical art to which the present invention pertains, and may be properly selected and used as needed.

The graft copolymer latex according to the present invention may be prepared into a powder form through general processes such as the aforementioned salt coagulation, washing, and drying. The resultant powder-type graft copolymer latex is mixed with a non-polar resin, such as a poly(arylene ether) resin, and then is subjected to extrusion and injection-molding, thereby being prepared into a molded article.

That is, the thermoplastic resin composition of the present invention is characterized by including the thermoplastic resin and the polyarylene ether resin.

The thermoplastic resin composition, for example, may have a form wherein the thermoplastic resin is dispersed in a matrix resin composed of a polyarylene ether resin (see FIGS. 1a, 1b, and 1c). In this case, balance between properties, such as impact strength and gloss, is superior.

The poly(arylene ether) resin may be, for example, a homopolymer of a compound represented by Formula 1 or 2 below, or a copolymer of a compound including Formula 1 or 2 below:

—Ar(R$_a$)$_n$—O— [Formula 1]

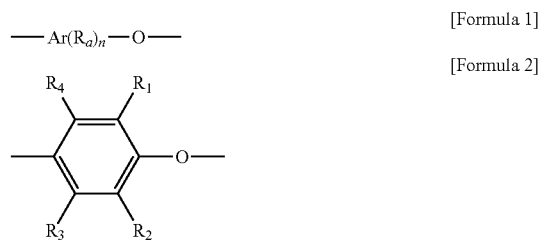

[Formula 2]

wherein R$_a$, R$_1$, R$_2$, R$_3$ and R$_4$ are substituents of an arylene group (Ar) or a phenylene group and are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy, or a nitro group, the n is an integer of 4 to 20, and Ar is an arylene group having 7 to 20 carbon atoms. In an embodiment, R$_1$ and R$_2$ may be an alkyl group or a C1 to C4 alkyl group, and R$^3$ and R$_4$ may be hydrogen.

The poly(arylene ether) resin may be, for example, a poly(phenylene ether)-based resin.

The poly(phenylene ether)-based resin refers to a poly (arylene ether) resin capable of being represented by [Formula 3] below:

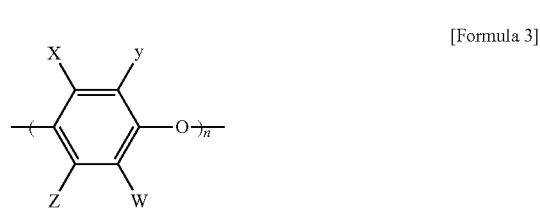

[Formula 3]

wherein each of W, X, Y, and Z are hydrogen or a substituent, and n is a repeat unit.

W, X, Y, and Z are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy, or a nitro group, and n is an integer of 4 to 20.

The homopolymer of the poly(arylene ether) resin is not specifically limited and, as a particular example, may be one or more selected from the group consisting of poly(2,6-dimethyl-1,4-phenylene) ether, poly(2,6-diethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dimethoxy-1,4-phenylene) ether, poly(2,6-dichloromethyl-1,4-phenylene) ether, poly(2,6-dibromomethyl-1,4-phenylene) ether, poly(2,6-diphenyl-1,4-phenylene) ether, and poly(2,5-dimethyl-1,4-phenylene) ether.

In addition, the copolymer of the poly(arylene ether) resin is not specifically limited and, as a particular example, may be one or more selected from the group consisting of a copolymer of 2,6-dimethylphenol and 2,3,6-trimethylphenol, a copolymer of 2,6-dimethylphenol and o-cresol, and a copolymer of 2,3,6-trimethylphenol and o-cresol.

The poly(arylene ether) resin may be included, for example, in an amount of 50 to 85% by weight, or 50 to 80% by weight based on a total weight of the resin composition according to the present invention. Within this range, superior impact strength, mechanical properties, and surface gloss are provided.

The poly(arylene ether) resin may have, for example, a weight average molecular weight of 10,000 to 100,000 g/mol, 10,000 to 70,000 g/mol, or 15,000 to 45,000 g/mol. Within this range, dimensional stability and property balance are excellent.

The thermoplastic resin composition may further include, for example, an additive such as a heat stabilizer, a light stabilizer, an antioxidant, an antistatic agent, an antimicrobial agent, or a lubricant, within a range within which properties thereof are not affected.

A specimen manufactured by melt-extruding the thermoplastic resin composition of the present invention may have a high surface gloss of greater than 66, greater than 80, 85 to 99, or 88 to 96 under a 45° light source.

The specimen may have an improved tensile elongation of greater than 32%, 40% or more, or 42 to 65%, which is measured according to ASTM D 638.

The specimen may be manufactured by injection-molding or extruding the thermoplastic resin composition at a processing temperature of 250 to 300° C. to prepare a pellet, followed by injection-molding and die processing.

The thermoplastic resin composition of the present invention has superior mechanical strength and excellent gloss, thereby being suitable as a substitute for conventional blended materials.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

Thermoplastic Resin Preparation Step
Seed Polymerization Step—Large-Diameter Seed Polymerization:

100 parts by weight of deionized water, 65 parts by weight of 1,3-butadiene as a monomer, 2.5 parts by weight of a mixture of an oleic acid dimer disclosed in Table 1 below and rosin soap as an emulsifier, 1.2 parts by weight of potassium carbonate ($K_2CO_3$) as an electrolyte, 0.4 parts by weight of tertiary dodecyl mercaptan (TDDM) as a molecular weight regulator, and 0.3 parts by weight of potassium persulfate ($K_2S_2O_8$) as a polymerization initiator were fed into a polymerization reactor filled with nitrogen batchwise, and reaction was allowed to proceed at a reaction temperature of 70° C. until a polymerization conversion rate reached 30 to 40%. Subsequently, 35 parts by weight of 1,3-butadiene were continuously added thereto and reaction was allowed to proceed at 75° C. until a polymerization conversion rate reached 60%. Subsequently, 0.2 parts by weight of potassium persulfate ($K_2S_2O_8$) were added thereto batchwise, temperate was elevated up to 82° C., and reaction was terminated when a polymerization conversion rate reached 95%. As a result, a polybutadiene rubber latex (large-diameter seed) having an average particle diameter of 3100 Å and a gel content of 70% by weight was obtained.

Seed Polymerization Step—Small-Diameter Seed Polymerization:

100 parts by weight of deionized water, 80 parts by weight of 1,3-butadiene as a monomer, 3.0 parts by weight of a mixture of an oleic acid dimer disclosed in Table 1 below and rosin soap as an emulsifier, 0.5 parts by weight of potassium carbonate ($K_2CO_3$) as an electrolyte, 0.4 parts by weight of tertiary dodecyl mercaptan (TDDM) as a molecular weight regulator, and 0.3 parts by weight of potassium persulfate ($K_2S_2O_8$) as a polymerization initiator were fed into a polymerization reactor filled with nitrogen batchwise, and reaction was allowed to proceed at a reaction temperature of 70° C. until a polymerization conversion rate reached 30 to 40%. Subsequently, 20 parts by weight of 1,3-butadiene were continuously added thereto and reaction was allowed to proceed at 75° C. until a polymerization conversion rate reached 60%. Subsequently, 0.2 parts by weight of potassium persulfate ($K_2S_2O_8$) were added thereto batchwise, temperate was elevated up to 82° C., and reaction was terminated when a polymerization conversion rate reached 95%. As a result, a polybutadiene rubber latex (small-diameter seed) an average particle diameter of 1200 Å and a gel content of 90% by weight was obtained.

Shell Polymerization Step 100 parts by weight of deionized water, 50 parts by weight (based on solids) of the polybutadiene rubber latex (large-diameter seed) polymerized in the seed polymerization step, and 5 parts by weight (based on solids) of the polybutadiene rubber latex (small-diameter seed) polymerized in the seed polymerization step were fed into a polymerization reactor filled with nitrogen. Subsequently, 5 parts by weight of a monomer mixture of styrene and acrylonitrile (acrylonitrile content: 5% by weight), 0.3 parts by weight of tertiary dodecyl mercaptan (TDDM) as a molecular weight regulator, and 0.2 parts by weight of t-butyl hydroperoxide as an polymerization initiator were sequentially added thereto, followed by stirring at 50° C. for 30 minutes. Subsequently, an oxidation-reduction catalyst including 0.035 parts by weight of dextrose, 0.06 parts by weight of sodium pyrophosphate, and 0.0015 parts by weight of ferrous sulfate was added thereto batchwise, and polymerization was performed while elevating temperature to 70° C. over a period of 1 hour.

Subsequently, an emulsion including 100 parts by weight of deionized water, 40 parts by weight of a monomer mixture of styrene and acrylonitrile (acrylonitrile content: 5% by weight), 1.0 part by weight of an oleic acid dimer (C36) as an emulsifier, 0.1 parts by weight of tertiary dodecyl mercaptan as a molecular weight regulator, and 0.1 parts by weight of cumene hydroperoxide as a polymerization initiator was continuously added thereto over a period of 2 hours under an isothermal condition of 70° C., and then was allowed to stand at 70° C. for additional 2 hours.

Here, a polymerization conversion rate was about 95%. Subsequently, 0.05 parts by weight of cumene hydroperoxide, along with an oxidation-reduction catalyst including 0.035 parts by weight of dextrose, 0.06 parts by weight of sodium pyrophosphate, and 0.0015 parts by weight of ferrous sulfate, were added thereto batchwise, and additional polymerization was performed for 1 hour while elevating temperature to 75° C. A polymerization conversion rate of a final polymer was about 98.8%.

Subsequently, the obtained ABS graft copolymer latex having a seed-shell structure was coagulated with 2 parts by weight of a sulfate, and then washed, thereby obtaining a powder (a1).

Thermoplastic Resin Composition Preparation Step 25 parts by weight of the obtained ABS graft copolymer powder (a1) and 75 parts by weight of polyphenylene ether were mixed in a mixer, and then were melted and kneaded at 250 to 300° C. by means of an extruder, thereby being pelletized. Subsequently, a specimen (A1) of Example 1 for measuring properties was manufactured using an injection machine.

Example 2

An experiment was carried out in the same manner as in Example 1, except that the polybutadiene rubber latex (large-diameter seed) polymerized in the seed polymerization step was added in an amount of 35 parts by weight instead of 50 parts by weight and the polybutadiene rubber latex (small-diameter seed) polymerized in the seed polymerization step was added in an amount of 20 parts by weight instead of 5 parts by weight in the shell polymerization step. As a result, an ABS graft copolymer powder (a2) was obtained.

Further, an experiment was carried out in the same manner as in Example 1, except that an ABS graft copolymer powder (a2) was added instead of the ABS graft copolymer powder (a1) in the thermoplastic resin composition preparation step of Example 1. As a result, a specimen (A2) of Example 2 was manufactured.

Example 3

An experiment was carried out in the same manner as in Example 1, except that, in the thermoplastic resin composition preparation step, the ABS graft copolymer powder (a1) was added in an amount of 50 parts by weight instead of 25 parts by weight and the polyphenylene ether was added in an amount of 50 parts by weight instead of 75 parts by weight. As a result, a specimen (A3) of Example 3 was manufactured.

Example 4

An experiment was carried out in the same manner as in Example 1, except that the polybutadiene rubber latex (large-diameter seed) polymerized in the seed polymerization step was added in an amount of 35 parts by weight instead of 50 parts by weight and the polybutadiene rubber latex (small-diameter seed) polymerized in the seed polymerization step was added in an amount of 20 parts by weight instead of 5 parts by weight in the shell polymerization step, the tertiary dodecyl mercaptan (TDDM) was added in an amount of 0.1 parts by weight instead of 0.3 parts by weight as a molecular weight regulator, and the acrylonitrile included in the monomer mixture of styrene and acrylonitrile added batchwise in the initial step and continuously added in the subsequent step was added in an amount of 10% by weight instead of 5% by weight. As a result, an ABS graft copolymer powder (a3) was obtained.

Further, an experiment was carried out in the same manner as in Example 1, except that an ABS graft copolymer powder (a4) was added instead of the ABS graft copolymer powder (a1) in the thermoplastic resin composition preparation step of Example 1. As a result, a specimen (A4) of Example 2 was manufactured.

Example 5

Polymerization was carried out using the same composition in the same manner as in Example 2, except that a large-diameter seed having a particle diameter of 3600 Å and a small-diameter seed having a particle diameter of 900 Å were used. As a result, an ABS graft powder (a5) was obtained. The ABS graft powder (a5) was processed in the same manner as in Example 2, thereby manufacturing a specimen (A5) of Example 5.

Example 6

Polymerization was carried out in the same manner as in Example 1, except that a myristoleic acid dimer was used in the same amount instead of the oleic acid dimer in the cell polymerization step. As a result, an ABS graft powder (a6) was obtained. The ABS graft powder (a6) was processed in the same manner as in Example 2, thereby manufacturing a specimen (A6).

Example 7

In the shell polymerization step of Example 1, the polybutadiene rubber latex (large-diameter seed) polymerized in the seed polymerization step was added in an amount of 40 parts by weight instead of 50 parts by weight, and the polybutadiene rubber latex (small-diameter seed) polymerized in the seed polymerization step was added in an amount of 15 parts by weight instead of 5 parts by weight. Subsequently, parts by weight of a monomer mixture of styrene and acrylonitrile (acrylonitrile content: 5% by weight), 0.05 parts by weight of tertiary dodecyl mercaptan (TDDM) as a molecular weight regulator, and 0.2 parts by weight of t-butyl hydroperoxide as an polymerization initiator were sequentially added thereto, followed by stirring at 50° C. for 30 minutes. Subsequently, an oxidation-reduction catalyst including 0.035 parts by weight of dextrose, 0.06 parts by weight of sodium pyrophosphate, and 0.0015 parts by weight of ferrous sulfate was added thereto batchwise, and polymerization was performed while elevating temperature to 70° C. over a period of 1 hour.

Subsequently, an emulsion including 100 parts by weight of deionized water, 30 parts by weight of a monomer mixture of styrene and acrylonitrile (acrylonitrile content: 5% by weight), 1.0 part by weight of an oleic acid dimer (C36) as an emulsifier, 0.05 parts by weight of tertiary dodecyl mercaptan as a molecular weight regulator, and 0.1 parts by weight of cumene hydroperoxide as a polymerization initiator was continuously added thereto over a period of 2 hours under an isothermal condition of 70° C., and then was allowed to stand at 70° C. for additional 2 hours.

Here, a polymerization conversion rate was about 95%. Subsequently, 0.05 parts by weight of cumene hydroperoxide, along with an oxidation-reduction catalyst including 0.035 parts by weight of dextrose, 0.06 parts by weight of sodium pyrophosphate, and 0.0015 parts by weight of ferrous sulfate, were added thereto batchwise, and additional polymerization was performed for 1 hour while elevating temperature to 75° C. A polymerization conversion rate of a final polymer was about 98.8%.

Subsequently, the obtained ABS graft copolymer latex having a seed-shell structure was coagulated with 2 parts by weight of a sulfate, and then washed, thereby obtaining a powder (a7).

Further, an experiment was carried out in the same manner as in Example 1, except that an ABS graft copolymer powder (a7) was added instead of the ABS graft copolymer powder (a1) in the thermoplastic resin composition preparation step. As a result, a specimen (A7) of Example 7 was manufactured.

Example 8

In the shell polymerization step of Example 1, the polybutadiene rubber latex (large-diameter seed) polymerized in the seed polymerization step was added in an amount of 40 parts by weight instead of 50 parts by weight, and the polybutadiene rubber latex (small-diameter seed) polymerized in the seed polymerization step was added in an amount of 15 parts by weight instead of 5 parts by weight. Subsequently, parts by weight of a monomer mixture of styrene and acrylonitrile (acrylonitrile content: 5% by weight), 0.02 parts by weight of tertiary dodecyl mercaptan (TDDM) as a molecular weight regulator, and 0.2 parts by weight of t-butyl hydroperoxide as an polymerization initiator were sequentially added thereto, followed by stirring at 50° C. for 30 minutes. Subsequently, an oxidation-reduction catalyst including 0.035 parts by weight of dextrose, 0.06 parts by weight of sodium pyrophosphate, and 0.0015 parts by weight of ferrous sulfate was added thereto batchwise, and polymerization was performed while elevating temperature to 70° C. over a period of 1 hour.

Subsequently, an emulsion including 100 parts by weight of deionized water, 30 parts by weight of a monomer mixture of styrene and acrylonitrile (acrylonitrile content: 5% by weight), 1.0 part by weight of an oleic acid dimer (C36) as an emulsifier, 0.02 parts by weight of tertiary dodecyl mercaptan as a molecular weight regulator, and 0.1 parts by weight of cumene hydroperoxide as a polymerization initiator was continuously added thereto over a period of 2 hours under an isothermal condition of 70° C., and then was allowed to stand at 70° C. for additional 2 hours.

Here, a polymerization conversion rate was about 95%. Subsequently, 0.05 parts by weight of cumene hydroperoxide, along with an oxidation-reduction catalyst including 0.035 parts by weight of dextrose, 0.06 parts by weight of sodium pyrophosphate, and 0.0015 parts by weight of ferrous sulfate, were added thereto batchwise, and additional polymerization was performed for 1 hour while elevating temperature to 75° C. A polymerization conversion rate of a final polymer was about 98.8%.

Subsequently, the obtained ABS graft copolymer latex having a seed-shell structure was coagulated with 2 parts by weight of a sulfate, and then washed, thereby obtaining a powder (a8).

Further, an experiment was carried out in the same manner as in Example 1, except that an ABS graft copolymer powder (a8) was added instead of the ABS graft copolymer powder (a1) in the thermoplastic resin composition preparation step. As a result, a specimen (A8) of Example 8 was manufactured.

Comparative Example 1

An experiment was carried out in the same manner as in Example 1, except that, in the shell polymerization step, the monomer mixture of styrene and acrylonitrile was used in an amount of 10 parts by weight (acrylonitrile content: 25% by weight) instead of 5 parts by weight (acrylonitrile content: % by weight), the monomer mixture of styrene and acrylonitrile continuously added was added in an amount of 35 parts by weight (acrylonitrile content: 25% by weight) instead of 40 parts by weight (acrylonitrile content: 5% by weight), and 1.0 part by weight of rosin acid potassium salt was added instead of 1.0 part by weight of the oleic acid dimer (C36) as an emulsifier. As a result, an ABS graft copolymer powder (b1) was obtained.

Further, an experiment was carried out in the same manner as in Example 1, except that an ABS graft copolymer powder (b1) was added instead of the ABS graft copolymer powder (a1) in the thermoplastic resin composition preparation step. As a result, a specimen (B1) of Comparative Example 1 was manufactured.

Comparative Example 2

An experiment was carried out in the same manner as in Example 1, except that the thermoplastic resin polymerization step was not performed and SG910 (manufactured by LG chemistry), as a high-impact polystyrene (hereinafter referred to as "HIPS"), was used in an amount of 25 parts by weight. As a result, a specimen (B2) of Comparative Example 2 was manufactured.

Comparative Example 3

An experiment was carried out in the same manner as in Example 1, except that the polyphenylene ether was added in an amount of 50 parts by weight instead of 75 parts by weight and HIPS used in Comparative Example 2 was added in an amount of 50 parts by weight instead of 25 parts by weight. As a result, a specimen (B3) of Comparative Example 3 was manufactured.

Comparative Example 4

A polymer was prepared in the same manner as in Comparative Example 1, except that 55 parts by weight of a large-diameter rubbery polymer were used alone as the rubbery polymer. Using the polymer, a powder (b2) was prepared. A specimen (B4) was manufactured using the method and the composition used in Comparative Example 1.

Comparative Example 5

A polymer was prepared in the same manner as in Comparative Example 1, except that 55 parts by weight of a small-diameter rubbery polymer were used alone as the rubbery polymer. Using the polymer, a powder (b3) was prepared. A specimen (B5) was manufactured using the method and the composition used in Comparative Example 1.

Test Example

Properties of the ABS graft copolymer powders (a1, a2, a4, a5, a6, a7, a8, b1, b2, and b3) obtained according to Examples 1 to 2 and 4 to 8 and Comparative Examples 1, 4, and 5 were measured according to the following methods. Results are summarized in Tables 1 and 2 below.

Measurement Methods

Average particle diameter (A): Measured by a dynamic laser light scattering method using a Nicomp 370HPL device manufactured by Nicomp, US.

Graft rate: Obtained according to Mathematical Equation 6 below and used as index an amount of a grafted polymer based on a total weight of added rubber during general graft polymerization. A Graft rate indicates a weight ratio of grafted polymer and has a different meaning from graft density. For example, a graft density is high as a molecular weight is small when a graft rate is the same.

Graft rate=((Grafted polymer)/(Rubber))×100     [Mathematical Equation 6]

Gel content (% by weight): A polybutadiene rubber latex was coagulated using a dilute acid or a metal salt and then washed, followed by drying for 24 hours in a 60° C. vacuum oven. An obtained rubber mass was finely cut with scissors and then 1 g of a rubber piece was immersed in 100 g of toluene, followed by storing in a room-temperature dark room for 48 hours. A separated sol and gel were respectively dried and then a gel content was calculated according to Mathematical Equation 3 below:

$$\text{Gel content (\% by weight)} = \frac{\text{Weight of insoluble matter (gel)}}{\text{Weight of sample}} \times 100 \quad \text{[Mathematical Equation 3]}$$

Polymerization conversion rate (%): 1.5 g of graft copolymer latex was dried in a 150° C. hot air dryer and then a weight thereof was measured to find a total solid content (TSC). A polymerization conversion rate was calculated according to Mathematical Equation 4 below.

$$\text{Polymerization conversion rate (\%)} = \frac{TSC \times \frac{(M+W+S)}{100} \cdot S}{} \quad \text{[Mathematical Equation 4]}$$

TSC: Total solid content (parts by weight)
M: Content of total of added monomers (parts by weight)
W: Content of added water (parts by weight)
S: Content of added emulsifier and other solid-type supplementary materials (parts by weight)

Surface gloss (Gloss, 45°): Measured at 45° according to a standard measurement method ASTM D528 using a specimen.

Coagulum content (Coagulum, % by weight): A weight of a coagulum generated in a reaction tank, a total weight of rubber, and a weight of monomers were measured, and a coagulum content was calculated according to Mathematical Equation 5 below:

$$\text{Solid coagulum content (\%)} = \frac{\text{Weight of coagulum generated in reaction tank (g)}}{\text{Total weight of rubber and monomers (g)}} \quad \text{[Mathematical Equation 5]}$$

Graft density (σ), total graft rate (%), and molecular weight (Mw): 1 g of an obtained powder-type thermoplastic resin was added to 50 g of acetone and dissolved therein while stirring for 24 hours. A resultant solution was separated by means of a centrifuge under conditions of 20,000 rpm and −20° C., and then a supernatant was separated. A precipitated precipitate was dried using a hot air dryer for 12 hours, and then a weight of a dried precipitate was measured. A graft rate was calculated according to Mathematical Equation 2 below using the measured weights.

Graft rate=Weight of grafted monomer (g)/weight of rubber (g)×100     [Mathematical Equation 2]

Weight of grafted monomers: (Weight of precipitate remaining after sol-gel separation)−(weight of rubber)
Weight of rubber: Theoretical solid weight of added rubbery polymer A dried sol separated from the supernatant was dissolved in a TFT solution, and then a molecular weight (Mw) thereof was measuring using GPC.

Further, graft density (σ) was calculated according to Mathematical Equation 1 below:

$$\sigma = \frac{g_d D \rho_P N_A}{6 M_g} \quad \text{[Mathematical Equation 1]}$$

$g_d$ represents a graft rate (%) calculated according to Mathematical Equation 2, and D represents an average particle diameter measured by a light scattering method.

ρ represents a density value of butadiene rubber particles measured according to ASTM D792. In the equation, $\rho_P$ represents a large-diameter PBL of 0.94 g/cm$^3$ and a small-diameter PBL of 0.97 g/cm$^3$.

$N_A$ is Avogadro's constant.

$M_g$ is a molecular weight measured by GPC and is present within 20,000 to 150,000.

For reference, in the case of Example 1, a graft rate was 0.7, $N_A$ was 6.02×10$^{23}$ (mol$^{-1}$), an average particle diameter (P/S) was 292.7273 nm, density (g/cm$^3$) was 0.943182, and a molecular weight (Mw/10$^3$) was 30 g/mol, whereby a graft density was 0.64.

Gas generation amount (ppm): A gas generation degree of each of prepared powders was obtained by measuring a weight reduction amount after allowing to stand for 60 minutes under nitrogen and 250° C. isothermal conditions by means of a TGA instrument.

TABLE 1

| Addition-type Classification | Types | Ex 1 (a1) | Ex 2 (a2) | Ex 4 (a4) | Ex 5 (a5) | Ex 6 (a6) | Ex 7 (a7) | Ex 8 (a8) |
|---|---|---|---|---|---|---|---|---|
| 1st addition batchwise | Large-diameter seed | 50 | 35 | 35 | 35 | 35 | 40 | 40 |
| | Small-diameter seed | 5 | 20 | 20 | 20 | 20 | 15 | 15 |

TABLE 1-continued

| Addition-type Classification | Types | Ex 1 (a1) | Ex 2 (a2) | Ex 4 (a4) | Ex 5 (a5) | Ex 6 (a6) | Ex 7 (a7) | Ex 8 (a8) |
|---|---|---|---|---|---|---|---|---|
| | Monomer addition amount | 5 | 5 | 5 | 5 | 5 | 10 | 10 |
| | AN % | 5 | 5 | 10 | 5 | 5 | 5 | 5 |
| | Molecular weight regulator | 0.3 | 0.1 | 0.1 | 0.1 | 0.1 | 0.05 | 0.02 |
| $2^{nd}$ continuous addition | Monomer addition amount | 40 | 40 | 40 | 40 | 40 | 30 | 30 |
| | AN % | 5 | 5 | 10 | 5 | 5 | 5 | 5 |
| | Molecular weight regulator | 0.1 | 0.1 | 0.1 | 0.1 | 0.1 | 0.05 | 0.02 |
| | Oleic acid dimer | 1.0 | 1.0 | 1.0 | 1.0 | 1.0 | 1.0 | 1.0 |
| Conversion rate (%) | | 98.8 | 98.9 | 98.0 | 98.2 | 98.4 | 98.8 | 98.2 |
| Graft rate | | 70% | 70% | 70% | 85% | 80% | 85% | 87% |
| Molecular weight (g/mol) | | 30,000 | 45,000 | 50,000 | 65,000 | 62,000 | 100,000 | 130,000 |
| Graft density ($\sigma$)- Mathematical Equation 1 | | 0.64 | 0.35 | 0.32 | 0.30 | 0.31 | 0.20 | 0.16 |
| Gas generation amount | | 1% or less | 1% or less | 1% or less | 1% or less | 1% or less | 1% or less | 1% or less |
| Coagulum content (%) | | 0.03 | 0.02 | 0.03 | 0.04 | 0.02 | 0.03 | 0.02 |

TABLE 2

| Addition-type Classification | Types | COM Ex. 1 (b1) | COM Ex. 4 (b2) | COM Ex. 5 (b3) |
|---|---|---|---|---|
| 1st addition batchwise | Large-diameter seed | 35 | 55 | — |
| | Small-diameter seed | 20 | — | 55 |
| | Monomer addition amount | 10 | 10 | 10 |
| | AN % | 25 | 25 | 25 |
| | Molecular weight regulator | 0.3 | 0.3 | 0.3 |
| $2^{nd}$ continuous addition | Monomer addition amount | 35 | 35 | 35 |
| | AN % | 25 | 25 | 25 |
| | Molecular weight regulator | 0.1 | 0.1 | 0.1 |
| | Rosin acid potassium salt | 1.0 | 1.0 | 1.0 |
| Conversion rate (%) | | 97.6 | 96.6 | 99.6 |
| Graft rate | | 37% | 36% | 36% |
| Molecular weight (g/mol) | | 85,000 | 80,000 | 90,000 |
| Graft density ($\sigma$)- Mathematical Equation 1 | | 0.10 | 0.13 | 0.05 |
| Gas generation amount | | 2.5% | 2.7% | 3.0% |
| Coagulum content (%) | | 0.05 | 0.07 | 0.08 |

Comparing Tables 1 and 2, it can be confirmed that, in the cases of Examples 1 to 2 and 4 to 8 prepared according to the present invention, a graft density is within a specific range, a gas generation amount is reduced, a coagulum content is reduced, and latex stability is improved after polymerization, compared to Comparative Examples 1, 4, and 5.

Additional Test Example

Properties of the thermoplastic resin composition specimens (A1, A2, A3, A4, A5, A6, A7, A8, B1, B2, and B3) of Examples 1 to 8 and Comparative Examples 1 to 3 were measured according to the following methods. Results are summarized in Table 3 below.

Measurement Methods

Impact strength (Notched Izod Impact Strength, kgf·m/m): Measured using a ¼" specimen according to a standard measurement method ASTM D256.

Tensile strength (TS, kg/cm$^2$): Measured according to ASTM D638.

Tensile elongation (TE, %): Measured according to ASTM D638.

Surface gloss (45°): Measured at 45° using a specimen according to a standard measurement method, ASTM D523.

TABLE 3

| Classification (parts by weight) | Ex 1 | Ex 2 | Ex3 | Ex 4 | Ex 5 | Ex 6 | Ex 7 | Ex 8 |
|---|---|---|---|---|---|---|---|---|
| PPO | 75 | 75 | 50 | 75 | 75 | 75 | 75 | 75 |
| ABS | a1 (25) | a2 (25) | a1 (50) | a3 (25) | a4 (25) | a5 (25) | a5 (25) | a5 (25) |
| HIPS | — | — | — | — | — | — | — | — |
| Impact strength (¼") | 22.5 | 23.4 | 27.0 | 24.2 | 23.0 | 22.0 | 23.7 | 24.0 |
| Tensile strength (TS) | 350 | 370 | 320 | 365 | 356 | 375 | 346 | 342 |

TABLE 3-continued

| Classification (parts by weight) | | | | | | | | |
|---|---|---|---|---|---|---|---|---|
| Tensile elongation (TE) | 48 | 49 | 65 | 48 | 45 | 42 | 45 | 48 |
| Gloss (45°) | 95 | 92 | 88 | 94 | 95 | 96 | 95 | 98 |

| Classification (parts by weight) | COM Ex 1 | COM Ex 2 | COM Ex3 | COM Ex 4 | COM Ex 5 |
|---|---|---|---|---|---|
| PRO | 75 | 75 | 50 | 75 | 75 |
| ABS | b1 (25) | — | — | b2 (25) | b3 (25) |
| HIPS | — | 25 | 50 | — | — |
| Impact strength (¼") | 10.2 | 4.8 | 6.6 | 12.3 | 5.0 |
| Tensile strength (TS) | 540 | 710 | 590 | 520 | 700 |
| Tensile elongation (TE) | 32 | 22 | 28 | 23 | 20 |
| Gloss (45°) | 60 | 50 | 15 | 52 | 55 |

As shown in Table 3, it can be confirmed that, in the cases of Examples 1 to 8 prepared according to the present invention, the molded articles manufactured by blending with polyphenylene ether exhibit superior impact strength, mechanical properties, and gloss, compared to Comparative Example 1 in which an average carbon number of a chain of the oleic acid-based dimer-based emulsifier included in the shell polymerization step is smaller than the cases of the present invention.

In addition, it can be confirmed that, in Comparative Example 2 or 3 in which HIPS was blended instead of the ABS thermoplastic resin powder prepared according to the present invention, impact strength and gloss are deteriorated.

Further, it can be confirmed that, in the case of Comparative Example 4 or 5 in which a unimodal seed was used instead of the bimodal seed-based ABS thermoplastic resin powder prepared according to the present invention, impact strength and gloss are deteriorated.

FIGS. 1a, 1b, and 1c illustrate SEM images of Example and Comparative Examples 1 and 2 summarized in Table 3. Particularly, the SEM images illustrate that the thermoplastic resin composition of each thereof is dispersed as a domain in a polyphenylene ether matrix. Referring to FIGS. 1a, 1b, and 1c, it can be confirmed that, in the case of the thermoplastic resin composition prepared according to the present invention, dispersion is improved compared to Comparative Example 1 or Comparative Example 2.

FIG. 2 illustrates thermogravimetric analysis (TGA) graphs of an oleic acid dimer, rosin soap (rosin acid potassium salt), and fatty soap (fatty acid potassium salt) including an emulsifier as summarized in Tables 1 and 2. Examining FIG. 2 and Table 4 below, it can be confirmed that the rosin soap exhibits excellent heat stability compared to the fatty soap, and the oleic acid-based dimer exhibits excellent heat stability compared to the rosin soap.

TABLE 4

| | Measurement condition | Weight loss (%) |
|---|---|---|
| Oleic acid dimer | 250° C. and N₂ isothermal conditions (60 min) | 23% |
| Rosin soap | | 49% |
| Fatty soap | | 76% |

As described above, the present invention may provide a blended material having equal or superior gloss and mechanical properties upon extrusion molding and injection-molding molding, compared to properties of conventional blended resins, by improving dispersion through blending of the thermoplastic resin having a composition capable of improving graft density.

The invention claimed is:

1. A thermoplastic resin, wherein the thermoplastic resin is a graft copolymer having a seed-shell structure and comprises a bimodal seed comprising a large-diameter rubbery polymer having an average particle diameter of greater than 2,000 Å and 3,500 Å or less and a small-diameter rubbery polymer having an average particle diameter of 500 Å to 2,000 Å; and an aromatic vinyl-vinyl cyan shell enclosing the seed, wherein the vinyl cyan compound is comprised in an amount of 5% by weight or more to less than 25% by weight based on a total weight of the aromatic vinyl-vinyl cyan shell,
wherein the bimodal seed comprises a conjugated bimodal diene-based rubbery polymer, and
wherein monomers used to prepare the conjugated bimodal diene-based rubbery polymer consist of one or more conjugated diene-based compounds selected from the group consisting of 1,3-butadiene, 2,3-dimethyl-1, 3-butadiene, 2-ethyl-1,3-butadiene, 1,3-pentadiene, and isoprene.

2. The thermoplastic resin according to claim 1, wherein the graft copolymer having a seed-shell structure further comprises (b) a shell enclosing the seed and prepared by polymerizing an aromatic vinyl compound, a vinyl cyan compound, and fatty acid or a metal salt thereof.

3. The thermoplastic resin according to claim 1, wherein the large-diameter rubbery polymer and the small-diameter rubbery polymer in the bimodal seed are comprised in a weight ratio of 50:50 to 90:10.

4. The thermoplastic resin according to claim 2, wherein the aromatic vinyl compound is one or more selected from the group consisting of styrene, α-methyl styrene, α-ethyl styrene, p-methyl styrene, o-methyl styrene, o-t-butyl styrene, bromostyrene, chlorostyrene, trichlorostyrene, and derivatives thereof.

5. The thermoplastic resin according to claim 2, wherein the vinyl cyan compound is one or more selected from the group consisting of acrylonitrile, methacrylonitrile, ethacrylonitrile, and derivatives thereof.

6. The thermoplastic resin according to claim 2, wherein the seed is comprised in an amount of 30 to 80% by weight and the shell (b) is comprised in an amount of 20 to 70% by weight based on 100% by weight of a total content of the conjugated bimodal diene-based rubbery polymer, the aromatic vinyl compound, and the aromatic vinyl compound and the vinyl cyan compound in the shell (b) are comprised in a weight ratio of 90:10 to 99:1.

7. The thermoplastic resin according to claim 2, wherein the fatty acid or the metal salt thereof is a mixture of a fatty acid having a chain of 10 or more carbon atoms or a metal salt thereof.

8. The thermoplastic resin according to claim 2, wherein the fatty acid or the metal salt thereof is an unsaturated fatty acid having an unsaturation degree of 1 to 20 or a metal salt thereof.

9. The thermoplastic resin according to claim 2, wherein the fatty acid or the metal salt thereof is comprised in an amount of 0.1 to 3 parts by weight based on 100 parts by weight of a total content of the conjugated diene-based rubbery polymer, the aromatic vinyl compound, and the vinyl cyan compound.

10. The thermoplastic resin according to claim 1, wherein the thermoplastic resin has a graft density ($\sigma$), represented by Mathematical Equation 1 below, greater than 0.12 and 0.80 or less:

$$\sigma = \frac{g_d D \rho \rho_P N_A}{6 M_g} \quad \text{[Mathematical Equation 1]}$$

wherein $g_d$ is a graft rate (%) calculated according to Mathematical Equation 2 below, D is an average particle diameter measured by a light scattering method, $\rho$ is a density value of butadiene rubber particles measured according to ASTM D792, $\rho_P$ represents a large-diameter PBL of 0.94 g/cm$^3$ and a small-diameter PBL of 0.97 g/cm$^3$, $N_A$ is Avogadro's constant, and $M_g$ is a molecular weight measured by GPC after dissolving a dried form of a sol, separated from a supernatant by a sol-gel separation method, in a TFT solution and is within 20,000 to 150,000 g/mol:

Graft rate=Weight of grafted monomers (g)/weight of rubber (g)×100  [Mathematical Equation 2]

wherein the weight of the grafted monomers is (a weight of a precipitate remaining after sol-gel separation (g))−(a weight of a rubber (g)), and the weight of the rubber is a theoretical solid weight of added rubbery polymer (g)).

11. The thermoplastic resin according to claim 1, wherein the thermoplastic resin is a coagulated salt powder having a weight average molecular weight of 20,000 to 200,000 g/mol.

12. A thermoplastic resin composition, comprising the thermoplastic resin according to claim 1 and polyarylene ether, wherein the thermoplastic resin is comprised in an amount of 15 to 50% by weight and the polyarylene ether is comprised in an amount of 50 to 85% by weight.

13. The thermoplastic resin composition according to claim 12, wherein a surface gloss, measured using a 45° light source, of a specimen manufactured by extruding and injection-molding the thermoplastic resin composition is greater than 66.

14. The thermoplastic resin composition according to claim 12, wherein a tensile elongation, measured according to ASTM D 638, of a specimen manufactured by extruding and injection-molding the thermoplastic resin composition is greater than 32%.

* * * * *